US007100091B2

United States Patent
Nakamoto et al.

(10) Patent No.: US 7,100,091 B2
(45) Date of Patent: Aug. 29, 2006

(54) METHOD AND SYSTEM FOR TESTING NETWORKS

(75) Inventors: Ed Nakamoto, Honolulu, HI (US); Floyd Cash, Honolulu, HI (US)

(73) Assignee: Spirent Communications, Calabasas, CA (US)

( * ) Notice: Subject to any disclaimer, the term of this patent is extended or adjusted under 35 U.S.C. 154(b) by 676 days.

(21) Appl. No.: 10/287,844

(22) Filed: Nov. 5, 2002

(65) Prior Publication Data

US 2004/0088605 A1    May 6, 2004

(51) Int. Cl.
*G06F 11/00* (2006.01)
(52) U.S. Cl. ....................................................... 714/43
(58) Field of Classification Search ................. 714/43, 714/47, 48, 56, 27, 37, 46
See application file for complete search history.

(56) References Cited

U.S. PATENT DOCUMENTS

| | | | |
|---|---|---|---|
| 6,249,883 B1* | 6/2001 | Cassidy et al. ............... | 714/42 |
| 6,269,330 B1* | 7/2001 | Cidon et al. .................. | 714/43 |
| 6,424,653 B1* | 7/2002 | Arsikere et al. ............. | 370/401 |
| 6,425,009 B1* | 7/2002 | Parrish et al. ............... | 709/224 |
| 6,578,077 B1* | 6/2003 | Rakoshitz et al. ........... | 709/224 |
| 6,859,900 B1* | 2/2005 | Garza et al. ................. | 714/716 |
| 6,922,663 B1* | 7/2005 | Maurer ......................... | 703/13 |
| 2002/0147937 A1* | 10/2002 | Wolf ............................. | 714/4 |
| 2003/0172321 A1* | 9/2003 | Wolin et al. .................. | 714/41 |

* cited by examiner

*Primary Examiner*—Nadeem Iqbal
(74) *Attorney, Agent, or Firm*—The Hecker Law Group, PLC (57) ABSTRACT

An embodiment of the invention comprises a method and system for testing a networking system's performance. The invention solves a problem related to upgrading system components associated with different steps of the testing process for networking systems. Systems embodying the invention comprise a processing apparatus and a testing apparatus, each of which contains a data bus. The two data buses are linked together through a bi-directional communication bridge that allows the testing apparatus and the processing apparatus to transparently communicate such that the bridged data buses behave as through they exist on a same local bus. The architecture provided by the invention allows for the upgrading of a processing apparatus for enhanced data processing performance without changing existing adequate testing devices.

32 Claims, 7 Drawing Sheets

METHOD AND SYSTEM FOR TESTING NETWORKS

FIELD OF THE INVENTION

The invention has application in the field of communications network test equipment. More particularly, the invention relates to an improved method and system for testing networks.

BACKGROUND

Broadband network service providers must be able to provide reliable service for a large number of customers by having communication equipment capable of transmitting vast amounts of data at speeds in excess of a guaranteed threshold. In order to guarantee the reliability of this communications equipment, testing under real-world and worst-case conditions is necessary. The testing of communications equipment is also important to the equipment manufacturers that develop and provide equipment to the service providers, as such manufacturers require a way of determining their equipment will function as planned.

A major problem for all parties concerned with network testing is the tremendous rate of growth of modern networks, both in terms of numbers of users and the required data transmission capacity. For example, the Internet has grown from connecting a several thousand users to millions of users in a few years. This growth has required tremendous improvements in the equipment providing Internet connections. To handle the current traffic loads, routers, in particular, have gone from using single, relatively low power microprocessors to using multiple microprocessors, each of which is far more powerful than earlier microprocessors.

As the complexity and capacity of the Internet increases, the capacity of network test equipment to conduct realistic tests must also increase. This has meant major, frequent increases in the speed and capacity of the testing equipment used to test networking systems. As a result, network test equipment manufacturers have had to constantly redesign test equipment in order to provide the fastest available microprocessors and associated hardware and software. Each time microprocessor manufacturers release a new microprocessor, the test equipment manufacturers must engage in a major redesign effort. These redesign efforts are difficult, expensive and labor intensive processes. Although new microprocessors are needed to keep up with the growth in router power, it has become increasingly difficult for the network test equipment manufacturers to keep up with the need for constant redesign to accommodate new microprocessors. It often seems that, as soon as the test equipment manufacturers have completed a design, the microprocessor manufacturers release a new microprocessor necessitating further redesign efforts. The customers for this equipment, principally the network service providers, are understandably concerned about the cost of frequent equipment replacement. They need a more flexible arrangement that can more easily cope with frequent changes in microprocessors.

A representative example of the current state of the art in broadband testing, and the problems faced by developers of this type of equipment, can be found in the Adtech AX/4000, manufactured by the Adtech division of Spirent Communications. This system can simultaneously test multiple combinations of Asynchronous Transfer Mode (ATM), Frame Relay, Ethernet, SONET, and IP technologies, with up to 1 million full-rate, real-time measurements at speeds up to 10 Gbps. These decoders comprise all of the major Internet protocols in use today. The system uses field programmable gate arrays (FPGAs) that are very fast and a system architecture that enables users to program their test modules on site to support the latest developments in broadband testing. The system architecture is fully scalable and offers real-time broadband test traffic generation as a means of performing realistic tests of networks and switches.

Test traffic generation comprises provisions for using multiple traffic sources and classes of service, various traffic distribution models and user defined traffic content and sequencing. The test traffic generation component of the system also offers traffic prioritization, traffic shaping, policing to determine if traffic is properly shaped and error injection for tracing purposes.

This broadband test system offers bi-directional monitoring and analysis capabilities for traffic in two directions and automatic traffic filters to analyze substreams, based on such criteria as packet identifier and type of packet. There is a provision for full-rate capture to capture traffic at full rate for further analysis or protocol decoding. Because data capture is at full rate, the analyzer captures every single byte of every packet or cell received during the capture period. While this unit is an outstanding representative broadband test apparatus, it cannot be readily upgraded to keep up with the growth of broadband demand by using the latest microprocessor technology as it becomes available. Such testing devices therefore rapidly become obsolete as the technology advances.

Different components of the testing technology evolve at different paces. The networking standards and protocols do not evolve as rapidly as the computing power needed to keep up with the increase of band-width and the complexity of network architectures.

The present invention discloses a solution for improving the performance of test equipment for testing networking systems by improving data processing capabilities without requiring the complete redesign of the remaining testing related hardware and software.

SUMMARY OF THE INVENTION

The invention discloses a method and system for testing networking systems. The system for testing a networking systems comprises testing equipment and data processing equipment that processes the data required for a test and generated during a test. Because the processing power required to test modern network systems must increase with the increase of the networks' bandwidth and complexity, and because networking devices may be made programmable, the need for upgrading the processing power is separate from the need for upgrading the testing devices in the system. The invention describes a solution for separating the processing part of a testing system from its test equipment part, while retaining the both speed and system performance.

Both the processing apparatus and testing apparatus of the network testing system possess a data bus. These data buses are linked through a bridge that combines two circuit boards: one coupled with the processing apparatus' data bus and the other coupled with the testing apparatus' data bus. The two circuit boards are linked to each other through a serial link.

The architecture described for network testing systems in the claimed invention allows the data processing apparatus to transparently communicate with the network testing devices mounted on the data bus of the testing apparatus. The processing apparatus contains computer program code for interfacing with one or more users, either locally or remotely, and computer program code for configuring the testing devices, monitoring network traffic, gathering test results and analyzing the test results to provide user reports.

DETAILED DESCRIPTION

The invention discloses a method and system for testing networking systems. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Figure 1A:
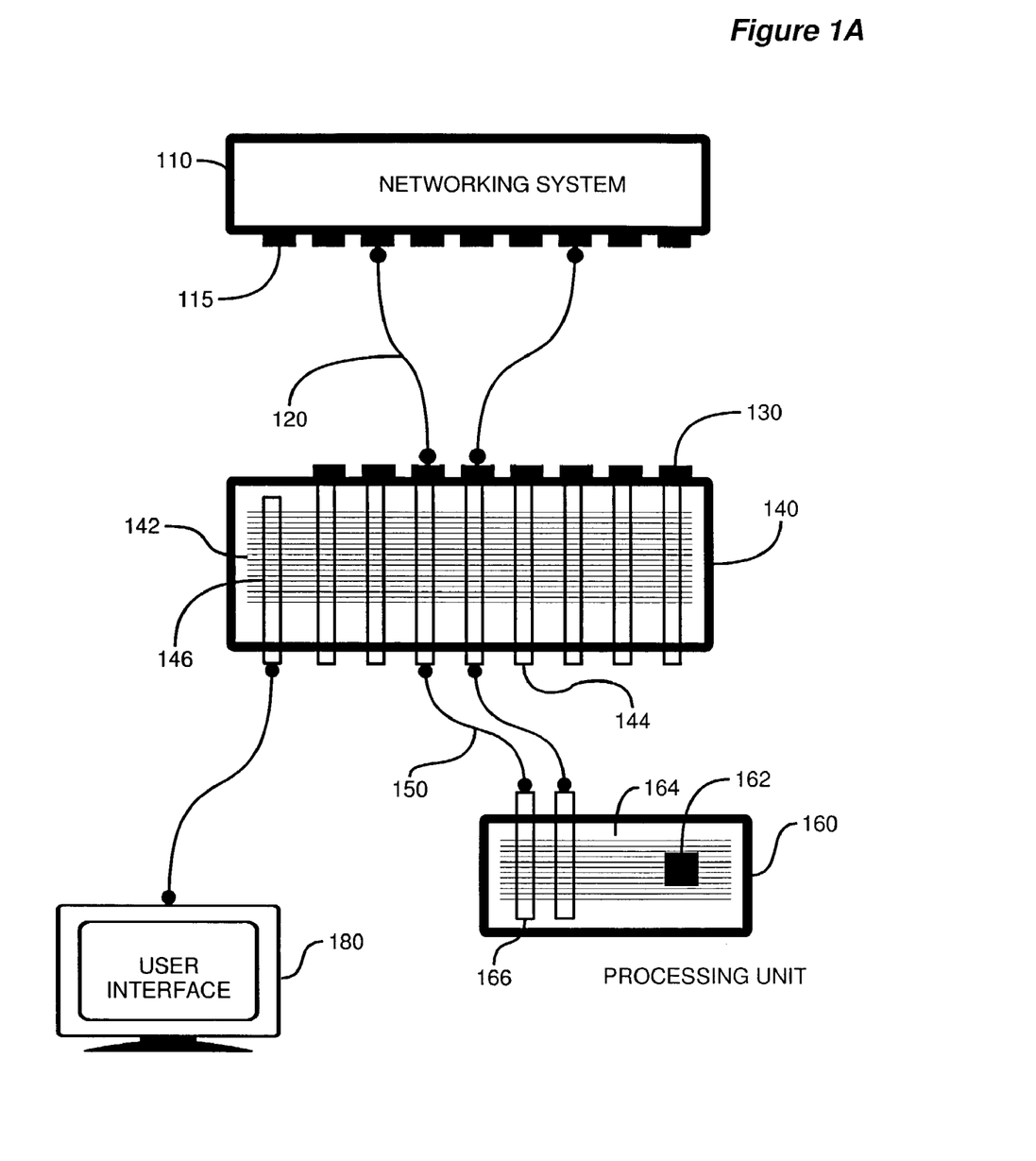
FIG. 1A is a bock diagram representing a network testing system implementing an embodiment of the invention.

FIG. 1A is a bock diagram representing a network testing system implementing an embodiment of the invention. Other systems embodying the invention are exemplified in several figures described below. Embodiments of the invention are implemented to test networking systems 110. A networking system is any machine capable of handling network data traffic. Examples of networking systems are hubs, repeaters, switches, routers and any machine connected to a network and capable of receiving and/or transmitting data through the network. A networking system such as a network switch performs one or more data processing on network data packets. A network switch, for example, inspects each packet for its destination and transmits each packet through the appropriate physical port 115 associated with the network route to its destination identified by its address. In other configurations, such as in network routers and firewalls, the networking system conducts more complicated processing of the data packets. For example, firewalls process data packets and apply sets of rules, which comprise filtering, blocking, redirecting of network traffic or any other rule that may be configured in the networking system.

A networking system usually comprises multiple physical ports 115 for connecting with other networking systems.

In an embodiment of the invention, a testing apparatus 140 is typically designed to test the capabilities of networking devices. To this end, a testing apparatus may have multiple input and output ports 130. The testing apparatus is typically connected to the networking system through one or more physical links 120.

Systems implementing the invention typically comprise at least one testing apparatus 140 containing one or more testing devices 144, a communication bus 142 in addition to other electronic components that allow the testing apparatus to exchange data within and with outside devices. Systems implementing the invention also comprise at least one processing apparatus 160 containing one or more processors 162, a communication bus 164 and one or more communication devices 166.

In embodiments of the invention, each of the testing apparatus 140 and the processing apparatus 160 comprises at least one data communication bus (e.g. 142 and 164). A data bus is typically a set of parallel connections configured to allow for the transmission of data and control instructions between electronic boards in an electronic apparatus. A widely utilized data bus architectures is the Peripheral Component Interconnect (PCI). The Peripheral Component Interconnect specification is an industry standard data bus architecture. The PCI architecture is designed to be synchronized with the clock speed of the microprocessor. A Peripheral Component Interconnect data bus is part of the architecture of most modern computers, example of such computers are those based on Intel's Pentium processor and the PowerPC. The Peripheral Component Interconnect data bus transmits 32 bits at a time through a 124-pin connection, and 64 bits through a 188-pin connection in an expanded implementation. A Peripheral Component Interconnect data bus uses all active paths to transmit both address and data signals, sending the address on one clock cycle and the data on the next clock cycle. Burst data can be transmitted starting with an address on the first cycle and a sequence of data transmissions can be sent on a certain number of successive cycles. In the system exemplified in FIG. 1A, the communication bus 142 is an Industry Standard Architecture (ISA) data bus, or a variation thereof. Other existing standards for data bus architectures comprise the Extended Industry Standard Architecture (EISA) and the Micro Channel Architecture (MCA). However, the data communication bus 142 and/or any other data communications bus described herein may be of any data bus types. Furthermore, embodiments of the invention may flexibly utilize future data bus architectures. In a current form, an embodiment of the invention implements the Peripheral Component Interconnect architecture which is no longer implemented as a local bus and is designed to be independent of microprocessor design.

In the system exemplified in FIG. 1A, the communication bus 142 is an Industry Standard Architecture (ISA) data bus. In addition, the network testing device 144, in embodiments of the invention, is equipped individually with a PCI bus and a serial link interface (see FIG. 1B and the description below). The latter PCI bus allow each testing device to communicate through a serial link 150 with a processing apparatus. The processing apparatus contains one or more communication interfaces that allow the processing apparatus to communicate through one or more serial links with the testing devices.

In embodiments of the invention the communication interface 166 is coupled with the testing device through a serial link 150. The combination of the communication interfaces 166, the serial link 150 and the local bus of the testing device constitute a bridge. Embodiments of the invention utilize a bi-directional bridge allowing for transparent communications at the two ends of the serial link 150. The bi-directional bridge allows the processing apparatus 160 to serve each of the testing devices as though they were directly coupled with bus 164.

In embodiments of the invention, the processing apparatus 160 is configured to run an operating system and computer programs that operate the testing apparatus 140. The processing apparatus allows users to input configuration parameters that may be interpreted and then communicated to the testing apparatus. A user may select a type of testing and the individual testing devices for conducting tests on one or more networking systems. Embodiments of the invention provide users with a software test suite that contains computer programs for simulating a network traffic distribution from one or more network data sources. Other computer program modules allow for prioritizing traffic (e.g., configuring the timing of the network communication of simulated nodes), policing traffic (e.g., buffering data packets and controlling the latency of the data packets' transit through the testing device), and injecting errors to test error detection and handling. The computer programs enable the testing system to simulate network traffic and adapt tests based on several aspects of processing performed by the simulated/emulate network nodes. For example, the testing device may be utilized to generate data packets as though generated by a switch, a firewall, or any other machine capable of communicating through a network. In the latter example, the testing system is enabled to adapt the processing of data packets depending on the protocol chosen, and one or more simulated tasks performed by the testing system.

Embodiments of the invention utilize a communication interface 146 in the testing apparatus to communication with a user interface 180. The communication interface is typically an electronic board coupled with the data bus and provides the capability of communicating data to a user interface. The communication interface may be network interface card for communicating through a network or any other communication interface such serial/parallel links.

In embodiments of the invention, the user interface 180 may be a typical workstation computer equipped with a central processing unit (CPU), random access memory (RAM) and all of the electronic components, well known in the art of computers, necessary to make the user interface process data and communicate with other computers and with human users. Embodiments of the invention contain, computer programs for running tests on networking systems, a set of programs for analyzing traffic, filtering traffic and capturing traffic for analysis and decoding. The test suite of programs provides a way for configuring test parameters, running tests and capturing and monitoring network traffic. Embodiments of the invention collect measurements about network traffic going into and coming out of a networking system in controlled situations and then analyze the data. The analysis may involve conducting one or more statistical analyses on the measurements, comparing data to previously run tests and/or comparing analysis results to a pre-defined benchmark.

Figure 1B:
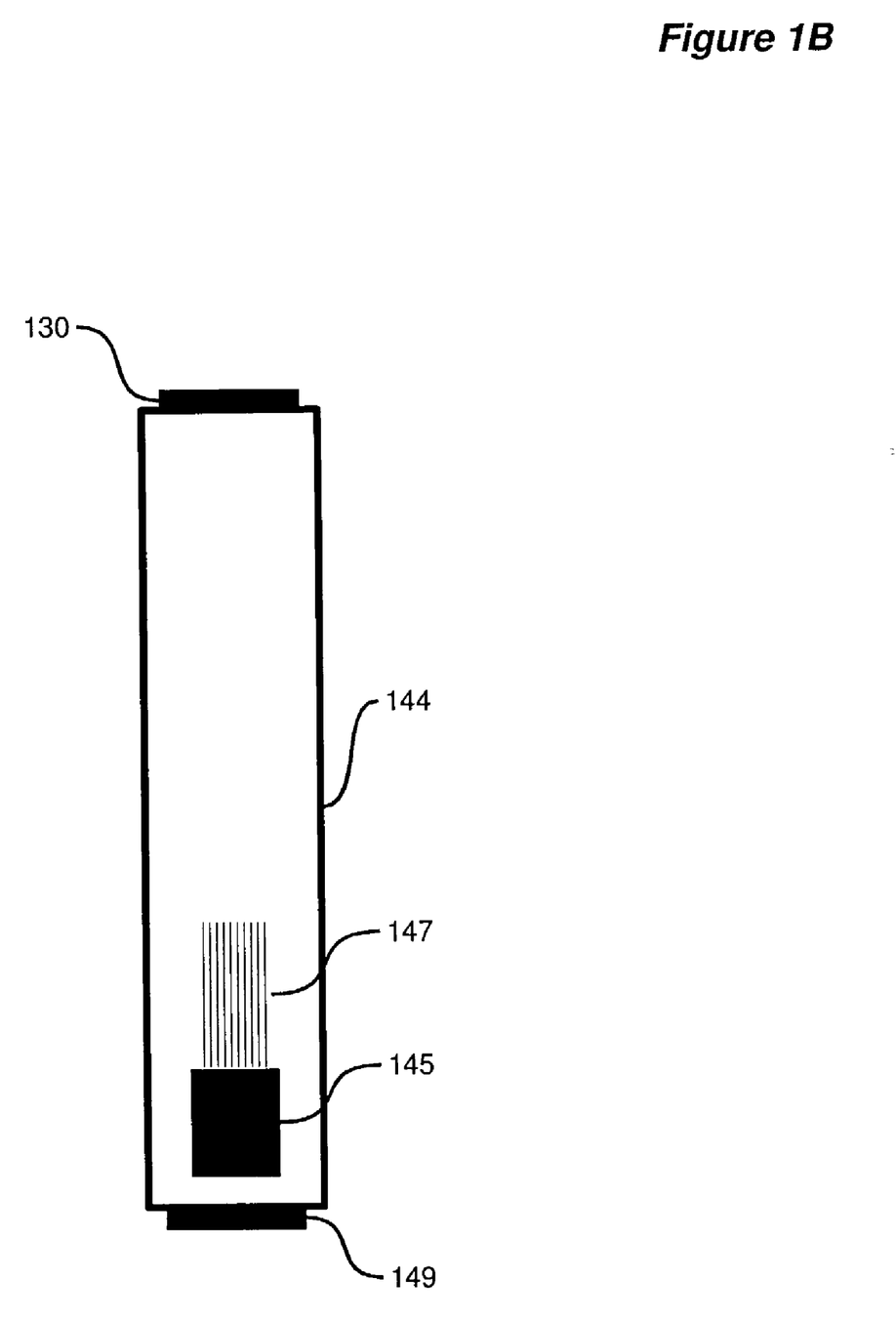
FIG. 1B is a block diagram representing a testing device as implemented in embodiments of the invention.

FIG. 1B is a block diagram representing a testing device as implemented in embodiments of the invention. The network testing device 144 is an electronic board containing electronic components (e.g. Silicon chips) designed to process network packets. A testing device 144 typically comprises an electronic circuit board that comprises electronic components such as field-programmable gate array c/hips, resistors, capacitors or any other electronic component necessary for building an electronic test device. A testing device may provide several capabilities for handling network traffic. Handling network traffic comprises generating network data packets, receiving network data packets, analyzing network data packets and monitoring network traffic. The capabilities for testing, monitoring and analyzing data are not limited to any specific set of functions, and they also are not limited by the type of electronic components implemented in the testing device. A testing device 144 is equipped with electronic components, such as field-programmable gate array chips that provide the capability of programming new functions to be performed by the device. Thus, a testing device may comprise such functional components as a network traffic generator that is a network node emulator capable of acting as a networking system. A networking device in embodiments of the invention may also be configured to act as a network traffic monitor and/or as a network traffic analyzer.

In embodiments of the invention, the testing device contains a chip 145, a bus 147 and serial port 149. Embodiments of the invention utilize an existing product that is sold under the name "PCI Split Bridge"™. The product implements a technology provided by chip referred to as the "Moselle" chip. The Moselle chip is engineered to optimize the motherboard design in computers by facilitating the connection of a circuit board that is remote from a motherboard in a way that allows the circuit board to behave as though it is located on the motherboard. The Moselle chip is typically implemented in computers to allow the connection of accessory circuit boards to a docked computer in a way that allows the accessories to act as if they are a part of the docked computer. To achieve this functionality, the PCI Split Bridge product provides a host bus adapter, which is an electronic board for coupling with the processing apparatus, and a daughter board destined for coupling with a testing apparatus. The host adapter and the daughter boards are configured to be linked to each other through a serial cable 150.

Figure 2:
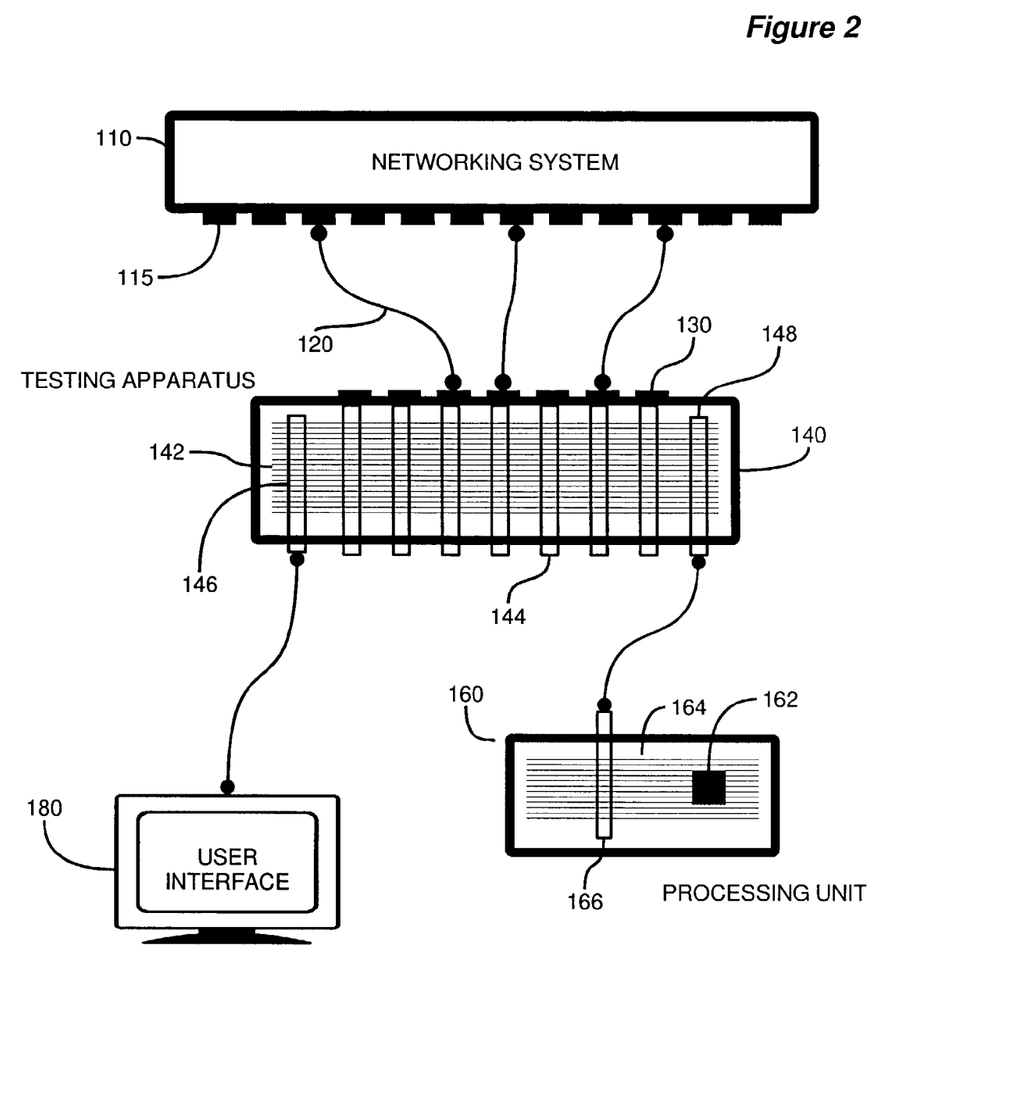
FIG. 2 is block diagram illustrating an architecture for coupling a testing apparatus and a processing apparatus by coupling their respective buses through a serial link, in embodiments of the invention.

FIG. 2 is block diagram illustrating an architecture for coupling a testing apparatus and a processing apparatus by coupling their respective buses through a serial link, in embodiments of the invention. In the latter configuration, the processing apparatus communicates with the testing apparatus through a serial link (e.g. Through a Split bridge).

The configuration of the example of FIG. 2 contains a communication interface 148 that allows bus 142 and bus 164 to appear as though they form a single entity.

Figure 3:
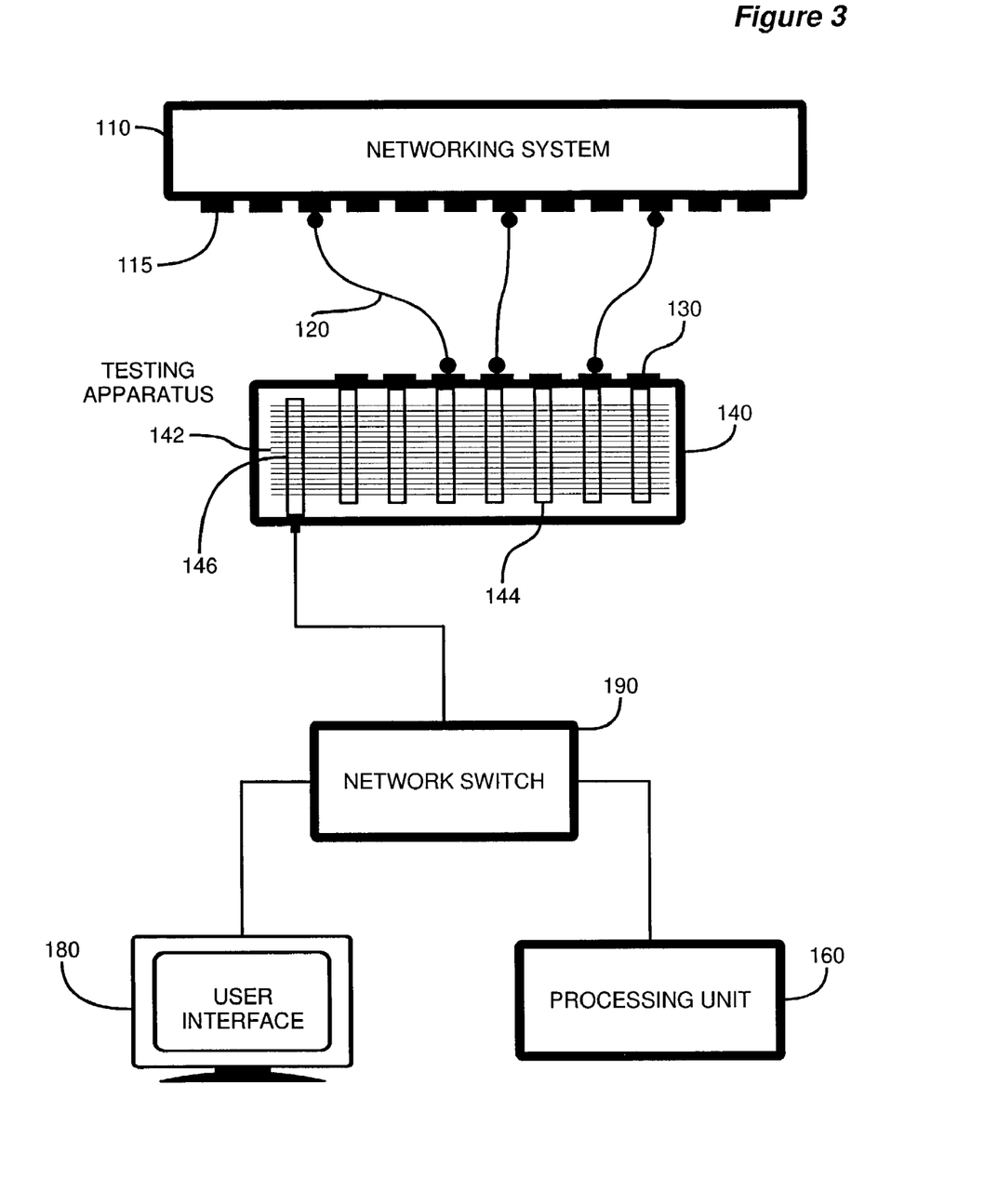
FIG. 3 is a block diagram illustrating an architecture for coupling a testing apparatus, a processing apparatus and a user interface through a networking apparatus in embodiments of the invention.

FIG. 3 is a block diagram illustrating an architecture for coupling a testing apparatus, a processing apparatus and a user interface through a networking apparatus in embodiments of the invention. In the configuration of FIG. 3, the testing apparatus is linked to the user interface and processing apparatus through a networking apparatus 190. The latter configuration allows the user interface and/or the processing apparatus to be located remotely and utilize standard networking protocols and applications to access the testing apparatus and processing apparatus.

Figure 4:
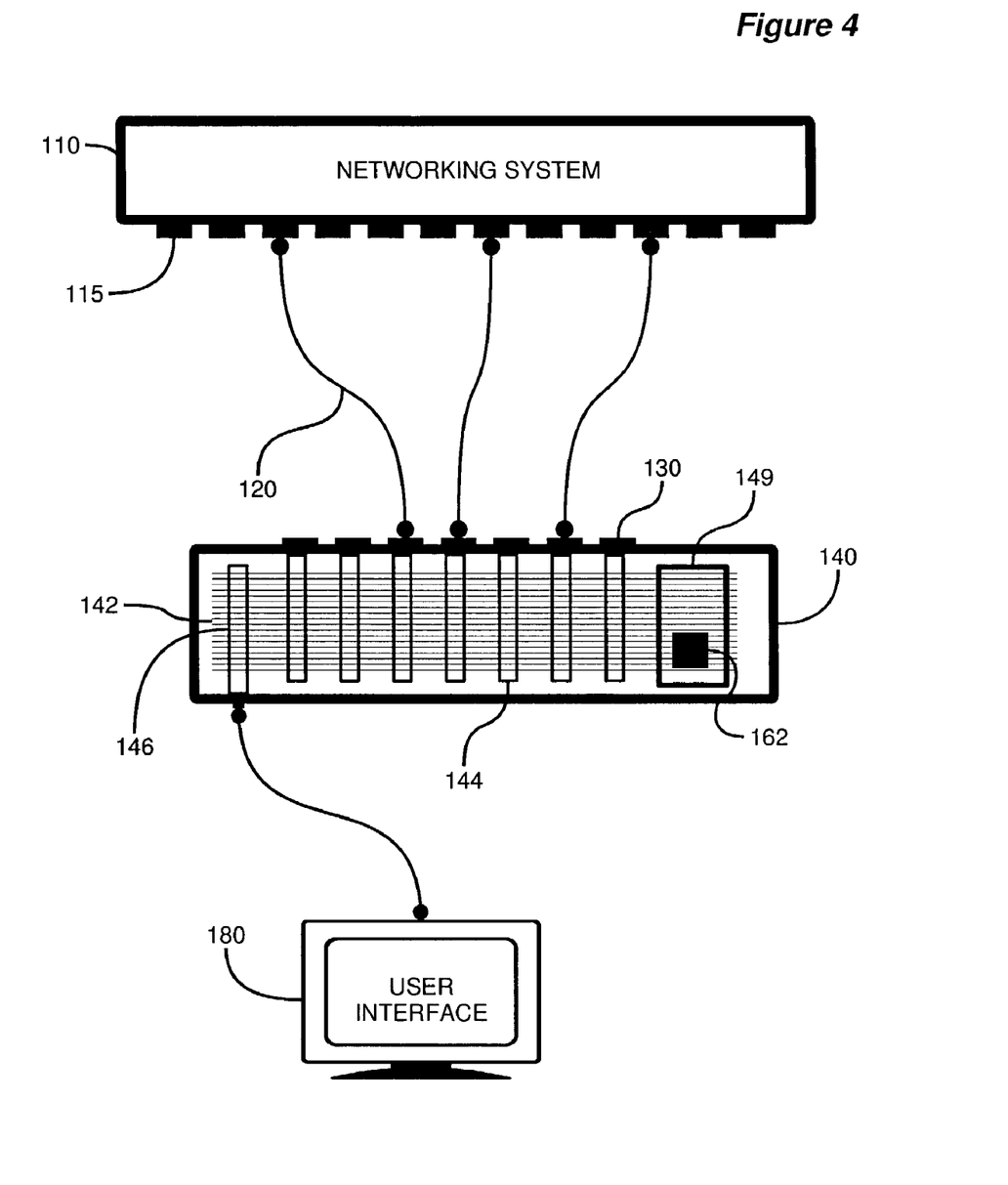
FIG. 4 is a block diagram illustrating an architecture for coupling a testing and processing apparatus with user interface, in accordance with embodiments of the invention.

FIG. 4 is a block diagram illustrating an architecture for coupling a testing and processing apparatus with user interface, in accordance with embodiments of the invention. In the latter configuration a processing device 149 is directly coupled with the bus 142 in the testing system. The processing device contains a processor 162, and computer programs for processing network data.

Figure 5:
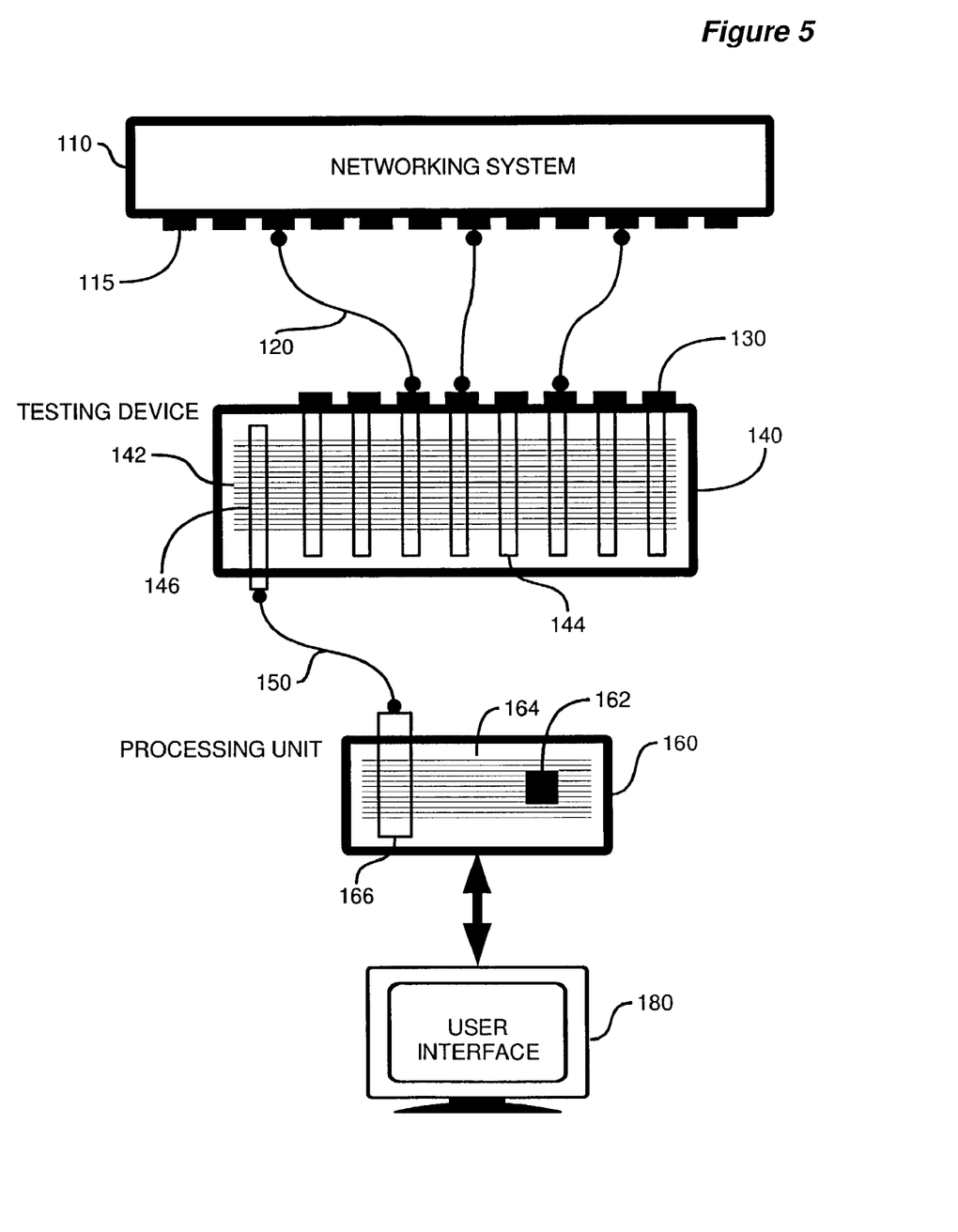
FIG. 5 is a block diagram illustrating an architecture for coupling a testing apparatus and a processing apparatus with user interface, in accordance with embodiments of the invention.

FIG. 5 is a block diagram illustrating an architecture for coupling a testing apparatus and a processing apparatus with user interface, in accordance with embodiments of the invention. In the latter configuration the testing apparatus and the processing apparatus are coupled through a bi-directional bridge (e.g. Split Bridge Technology). The bi-directional bridge allow the testing apparatus and the processing apparatus to transparently communicate through the bridge behaving as though they shared the single data bus. The user interface system may be linked to the processing in any configuration possible (e.g. Through a network connection).

Figure 6:
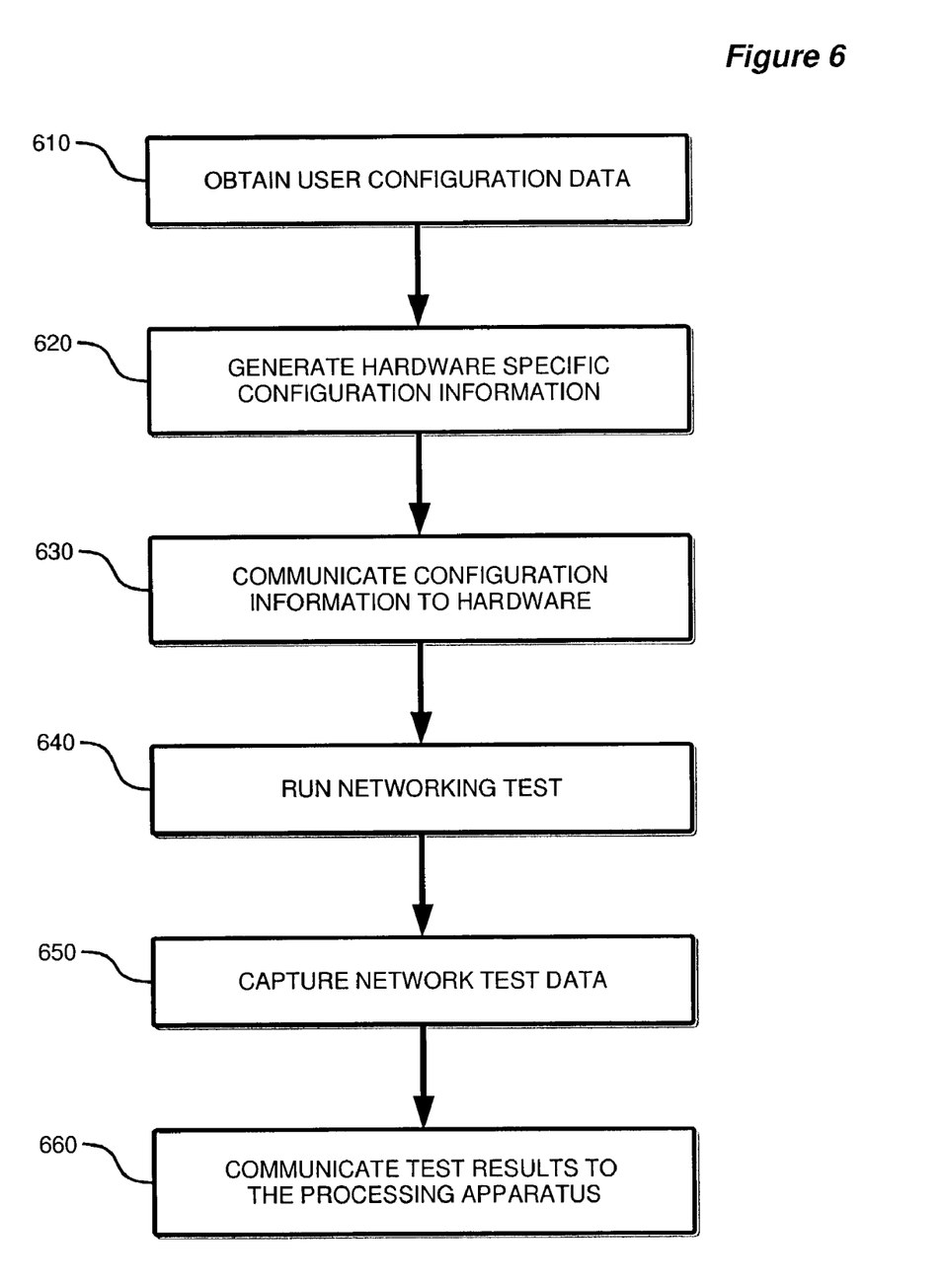
FIG. 6 is a flowchart illustrating the steps involved in the methodology of testing a networking system using embodiments of the invention.

FIG. 6 is a flowchart illustrating the steps involved in the methodology of testing a networking system using embodiments of the invention. Testing a networking system's performance requires addressing several aspects of the functionality of handling network traffic. A networking system may be designed to provide one or more functions for handling network traffic. A networking system may be designed to distribute traffic across all network nodes, as in the case of hubs or route packets on a port-by-port basis and/or perform packet routing (or blocking), depending on user-defined rules as in the case of load-balancing systems, routers and firewalls.

Embodiments of the invention allow a user to design a test strategy, run it through the system, monitor the test and analyze the outcome. This is achieved in systems implementing the invention by utilizing one or more configurable testing devices 144, connected to a processing apparatus through a bi-directional bridge, represented in FIG. 1 by its components 146, 150 and 166.

The processing apparatus, in accordance with embodiments of the invention, provides computer programs to interface with users allowing the users to enter configuration data through a user interface at step 610. Obtaining user configuration data may involve automatically running software scripts that follow the a user's actions or a programmed instruction to run the scripts. The system then generates hardware specific configuration information specifically designed to drive the testing devices at step 620. Since the testing devices are transparently accessible to the processing apparatus, the identification information for each testing device may be obtained as though the testing device is located on the local data bus of the processing apparatus. The identification information may comprise all or part of the hardware information, comprising the bus address, interrupt numbers and all other information that allows the processing apparatus to properly address and control the testing device. The system communicates the configuration information to the testing device hardware through the communication bridge linking the two separate data buses that are part of the processing apparatus and the testing apparatus, respectively, at step 630.

At step 640, systems embodying the invention utilize the configuration information to run a networking test by selecting the testing functions that are involved in a testing session. For example, a user may choose to test how the bandwidth of the networking apparatus scales up under conditions representing a heavy load. The user may also elect to study one more networking protocols in particular detail. Examples of network communications protocols are the Hypertext Transfer Protocol (HTTP) and the Secure Hypertext Transfer Protocol, that underlie most of the world wide web (WWW) traffic and the File Transfer Protocol (FTP) that allows for point-to-point transfer of electronic files. Other examples comprise the Simple Mail Transfer Protocol (SMTP), that underlies the posting of electronic mail, and the Post Office Protocol 3 (POP3), utilized in fetching electronic mail. The testing device is configured in accordance with the user's configuration information to generate simulated network traffic designed to test one or more aspects of the networking functions supported by the networking system.

Systems embodying the invention may also behave as one or more networking systems. In this case the testing apparatus simulates one or more network nodes exchanging network data and involves the networking system undergoing testing to determine its ability to handle the networked communications. Furthermore, the system may introduce errors in data packets to simulate real world experiences with errors occurring in faulty networking systems or simply under a heavy load of traffic. Thus, simulation of network traffic may comprise inserting errors into network traffic. The network traffic generated for testing is applied to the networking system as an input test parameter.

At step 650, a system embodying the invention captures network test data, and monitors network traffic, by inspecting a time stamp inserted into the data packets. At step 660, the system communicates the captured information, representing test results, in accordance with the user's configuration information, through the bi-directional bridge to the processing apparatus.

Thus, a method and a system for testing networking systems utilizing a split system having a processing apparatus and a testing apparatus linked through a bi-directional bridge has been disclosed. The method and system allow the processing apparatus to transparently access and control testing devices on a remote apparatus as though the testing devices are located on a local system data bus.

What is claimed is:

1. A system for testing networking systems comprising:
    a testing apparatus comprising at least one testing device coupled with a first bus, wherein said at least one testing device is configured to communicate with at least one networking system on a network;
    a processing apparatus coupled with a second bus, wherein said processing apparatus is configured to process test data received from said at least one testing device; and,
    a bi-directional bridge coupling said first bus and said second bus to emulate a single local bus, said bi-directional bridge configured to allow said processing apparatus to communicate, through said second bus, to address said at least one testing device comprising:
    a data communication link;
    a first interface coupling said first bus and said data communication link; and
    a second interface coupling said second bus and said data communication link.

2. The system of claim 1 wherein said at least one testing device further comprises at least one network traffic generator.

3. The system of claim 2 wherein said at least one network traffic generator further comprises at least one network node emulator.

4. The system of claim 1 wherein said at least one testing device further comprises at least one network traffic monitor.

5. The system of claim 1 wherein said at least one testing device further comprises at least one network traffic analyzer.

6. The system of claim 1 wherein said at least one testing device further comprises hardware that supports multi-user remote access.

7. The system of claim 1 wherein said at least one testing apparatus further comprises hardware that supports remote distributed testing.

8. The system of claim 1 wherein said processing apparatus comprises software for simulating traffic distribution.

9. The system of claim 1 wherein said processing apparatus comprises software for simulating user defined traffic.

10. The system of claim 1 wherein said processing apparatus comprises software for prioritizing traffic.

11. The system of claim 1 wherein said processing apparatus comprises software for policing traffic.

12. The system of claim 1 wherein said processing apparatus comprises software for injecting errors to test error detection and handling.

13. The system of claim 1 wherein said processing apparatus comprises software for monitoring traffic.

14. The system of claim 1 wherein said processing apparatus comprises a software test suite.

15. The system of claim 1 wherein said processing apparatus comprises software for analyzing traffic.

16. The system of claim 15 wherein said software for analyzing traffic comprises software for filtering traffic.

17. The system of claim 15 wherein said software for analyzing traffic comprises software for capturing traffic for analysis and decoding.

18. The system of claim 15 wherein said software for analyzing traffic comprises software for providing a graphical view of said analyzed traffic in real time.

19. The system of claim 1 wherein said processing apparatus comprises a microprocessor and operating system software.

20. The system of claim 19 wherein said processing apparatus further comprises test and analysis software executed by said microprocessor.

21. The system of claim 1 wherein said first interface further comprises hardware components for supporting serial communication.

22. The system of claim 1 wherein said second interface further comprises hardware components for supporting serial communication.

23. A method for testing networking systems performance comprising:
    obtaining user configuration data through a user interface of a processing apparatus;
    generating configuration information specifically for at least one testing device for testing at least one networking system;
    providing said configuration information to said at least one testing device through a communication bridge linking two separate data buses comprising a first bus and a second bus, said communication bridge emulating a local bus connection between said first bus and said second bus, wherein said at least one testing device is coupled with said first bus and wherein said processing apparatus comprises said second data bus;
    generating network traffic data;
    applying said network traffic data to said at least one networking system;
    capturing a test result of said at least one networking system; and
    communicating said test result to said processing apparatus through said communication bridge.

24. The method of claim 23 wherein said obtaining user configuration data further comprises automatically running software scripts.

25. The method of claim 23 wherein said generating configuration information further comprises obtaining an identification for each one of said at least one testing device on a local data bus.

26. The method of claim 25 wherein said obtaining said identification further comprises obtaining at least one hardware address.

27. The method of claim 23 wherein said providing said configuration information to said at least one testing device further comprises transparently addressing said second data bus.

28. The method of claim 23 wherein said generating network traffic data further comprises simulating network traffic from at least one network node.

29. The method of claim 28 wherein said simulating network traffic further comprises inserting errors in said network traffic.

30. The method of claim 23 wherein said generating network traffic data further comprises generating said network traffic at a plurality of band-width data loads.

31. A network testing unit comprising:
    a configurable testing apparatus comprising a first circuit board on a first data communication bus, said first circuit board comprising one or more network ports configured to communicate with one or more ports of a network system under test;
    a processing apparatus comprising a second circuit board and a second data communication bus, wherein said processing apparatus is configured to execute computer program code for operating said configurable testing apparatus based on configuration parameters received from a user, and wherein said processing apparatus is configured to process test data received from said configurable testing apparatus; and,
    a bi-directional bridge coupling said first data communication bus and said second data communication bus to emulate a single local bus coupling said configurable testing apparatus and said processing apparatus, said bi-directional bridge configured to allow said processing apparatus to directly address a plurality of hardware components within said configurable testing apparatus.

32. A method for testing networking system performance comprising:
    emulating a single local bus in a network testing unit by providing a bi-directioal bridge between a first bus of a processing apparatus and a second bus of a configurable testing apparatus, wherein a plurality of hardware components on a first circuit board of said configurable testing apparatus are directly addressable from a second circuit board of said processing apparatus;
    obtaining user configuration data through a user interface of said processing apparatus;
    said processing apparatus interpreting said user configuration data to operate said configurable testing apparatus;
    said configurable testing apparatus generating and capturing network traffic data through one or more ports coupled to a network system under test; and
    said configurable testing apparatus communicating captured network data to said processing apparatus through said emulated single local bus.

* * * * *